(12) United States Patent
Kuroda

(10) Patent No.: US 7,800,270 B2
(45) Date of Patent: Sep. 21, 2010

(54) SMALL DC MOTOR

(75) Inventor: Minoru Kuroda, Yonago (JP)

(73) Assignee: Minebea Motor Manufacturing Corporation, Tokyo (JP)

( * ) Notice: Subject to any disclaimer, the term of this patent is extended or adjusted under 35 U.S.C. 154(b) by 0 days.

(21) Appl. No.: 12/591,439

(22) Filed: Nov. 19, 2009

(65) Prior Publication Data

US 2010/0072848 A1 Mar. 25, 2010

Related U.S. Application Data

(63) Continuation of application No. 12/320,254, filed on Jan. 22, 2009, now Pat. No. 7,732,962, which is a continuation of application No. 11/483,670, filed on Jul. 11, 2006, now Pat. No. 7,498,706.

(30) Foreign Application Priority Data

Jul. 11, 2005 (JP) ............................. 2005-202300
Dec. 1, 2005 (JP) ............................. 2005-348028

(51) Int. Cl.
*H02K 21/26* (2006.01)

(52) U.S. Cl. ................................. 310/154.01

(58) Field of Classification Search ...............
310/154.01–154.59, 40 MM, 216.001
See application file for complete search history.

(56) References Cited

U.S. PATENT DOCUMENTS

| 3,296,471 | A | | 1/1967 | Cochardt | |
|---|---|---|---|---|---|
| 4,376,903 | A | * | 3/1983 | Mishima | ................ 310/154.43 |
| 4,453,097 | A | | 6/1984 | Lordo | |
| 4,528,469 | A | * | 7/1985 | Prenner et al. | ................. 310/59 |
| 5,473,210 | A | | 12/1995 | Someya et al. | |
| 5,500,994 | A | | 3/1996 | Itaya | |
| 5,742,110 | A | | 4/1998 | Hefner | |
| 5,920,139 | A | | 7/1999 | Fujiwara et al. | |
| 7,427,817 | B2 | | 9/2008 | Uenishi et al. | |
| 7,498,706 | B2 | | 3/2009 | Kuroda | |
| 2006/0279159 | A1 | | 12/2006 | Kuroda | |

FOREIGN PATENT DOCUMENTS

| EP | 0 798 842 A1 | 10/1997 |
|---|---|---|
| EP | 1 727 259 A2 | 11/2006 |
| GB | 1 018 660 | 1/1966 |
| JP | 60-144137 | 7/1985 |
| JP | 7-59322 | 3/1995 |
| JP | 9-224337 | 8/1997 |
| JP | 11-103552 | 4/1999 |
| JP | 2000-279885 | 10/2000 |
| JP | 2001-28856 | 1/2001 |

* cited by examiner

*Primary Examiner*—Nguyen N Hanh
(74) *Attorney, Agent, or Firm*—Foley & Lardner LLP

(57) ABSTRACT

A small DC motor includes: a motor frame including a cylindrical portion, the cylindrical portion having a constant thickness and having a cross section in a shape that includes four sides and connecting portions, each of the connecting portions connecting adjacent two of the four sides and being located inward from a corresponding corner in a quadrangle including the four sides; field magnets; and an armature assembly, wherein the field magnets are provided so as to be spaced apart from each other, and the small DC motor includes an air gap between each of the four sides and a radially outermost surface of the armature assembly, the air gap being a minimum size needed to rotate the armature assembly.

7 Claims, 7 Drawing Sheets

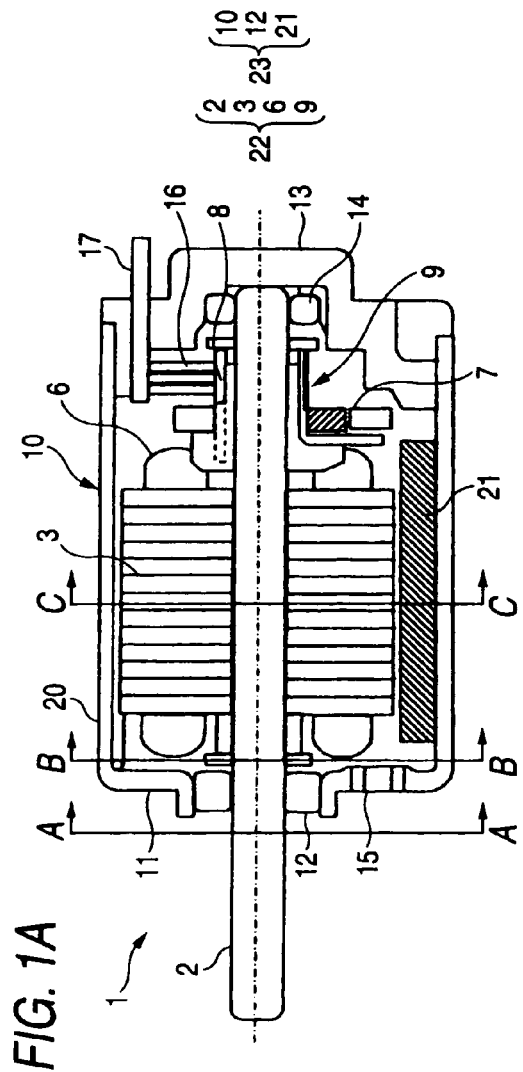
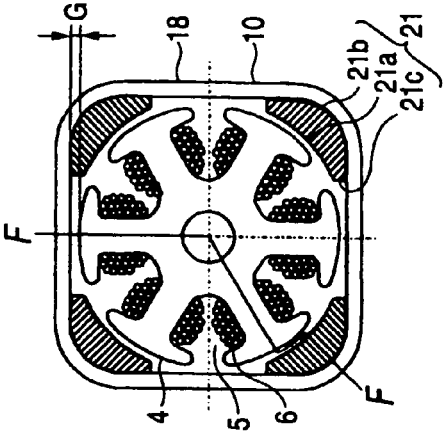
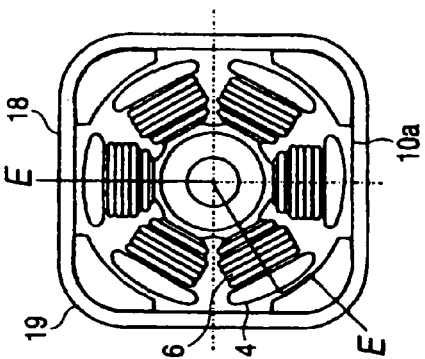
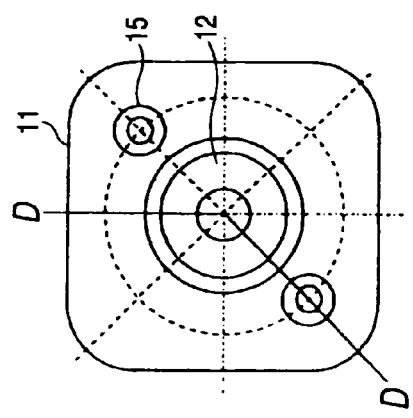

SMALL DC MOTOR

This application is a continuation application of Ser. No. 12/320,254, filed Jan. 22, 2009, which is a continuation application of Ser. No. 11/483,670, filed Jul. 11, 2006, now U.S. Pat. No. 7,498,706. The foregoing applications are hereby incorporated by reference.

BACKGROUND OF THE INVENTION

1. Field of the Invention

The invention relates to a small DC (direct current) motor, and more particularly to a small DC motor which is small in size but which has a large torque.

2. Background Art

In the field of small DC motors, there is an increasing tendency to demand motors small in size and light in weight. In DC motors which have cylindrical motor frames having circular cross sections, there is caused a limitation on a relationship between the shape of a field magnet and necessary magnetization characteristics, and in addition, a separate mounting configuration becomes necessary.

In contrast, in DC motors which have motor frames having quadrangular cross sections, necessary magnetization characteristics or magnetic properties which appear as if they matched a sinusoidal magnetization curve can be generated by increasing the thickness of a field magnet at a corner portion of the motor frame, so that the motor frame can be formed into a shape which produces necessary magnetization characteristics. In addition, since the cross section of the motor frame is quadrangular, any of sides of the motor frame is allowed to extend along a mounting surface, which facilitates mounting.

As examples of the DC motors, there exist DC motors disclosed in JP-A-7-059322 (the term "JP-A" as used herein means an "unexamined published Japanese patent application") and JP-A-2000-279885, respectively.

In the example disclosed in JP-A-7-059322, field magnets are integrally molded in an interior of an angularly cylindrical motor frame having a square cross section. The field magnets are magnetized to exhibit four equal magnetic poles which are polarized, respectively, to an N pole and an S pole in an alternating fashion so that centers of the magnetic poles coincide with corner portions of the motor frame. The field magnets are formed into a shape which is angular on an outside and is curved into an arc-shape on an inside thereof. The field magnets are arranged in such a manner as to be in contact with the adjacent field magnets. A rotor is disposed inside the field magnets so arranged.

FIG. 7 is a drawing which illustrates a conventional configuration of field magnets disclosed in JP-A-2000-279885.

In FIG. 7 illustrated in JP-A-2000-279885, a rectangular prism-shaped motor frame comprises an upper motor frame 101 and a lower motor frame (not illustrated) which are made of a metallic material. A plurality of field magnets 102, which are each externally angular and internally circular, are provided on inner walls of the upper motor frame 101. The field magnets 102 are installed, respectively, at four corner portions of the quadrangular upper motor frame 101 and comprise four field magnets 102a, 102b, 102c and 102d which are each formed into a shape which is angular on an outside and is formed into an arc-shape on an inside thereof. The field magnets 102 are disposed adjacent to each other via a minute gap Δg. A rotor (not illustrated) is disposed inside the field magnets 102 so disposed.

In the example of JP-A-2000-279885, the field magnets 102 which are each externally angular and internally curved in an arc are disposed at the corner portions of the upper motor frame. This configuration is preferable in that necessary magnetization characteristics can be obtained. In this configuration, however, not only an air gap necessary for the armature core to rotate smoothly but also the field magnets 102 are interposed between the motor frame and an armature core. Thus, since the field magnets 102 are so interposed, a length from an axial center of the armature core to a radially outer side thereof is reduced by a radial thickness of the field magnet 102. As a result, the effective magnetic flux per slot of the armature core is lowered, leading to a state where torque generated in the armature core does not work effectively. Furthermore, the number of times of winding a winding which can be wound around the armature core is reduced, and torque generated in the armature core is lowered by such an extent.

Also, in the example of JP-A-7-059322, as in the example of JP-A-2000-279885, the field magnets as well as a necessary air gap are interposed between the motor frame and an armature core. Due to this, in the example of JP-A-7-059322, as in the example of JP-A-2000-279885, torque generated in the armature core becomes small.

SUMMARY OF THE INVENTION

An objection of the invention is to provide a small DC motor configured such that field magnets (hereinafter also simply referred to as "magnets") are provided in a motor frame having the same number of corner portions as the number of polarized magnetic poles so as to increase torque to be generated while keeping the shape of the small DC motor (hereinafter also simply referred to as a "motor") small without increasing the same.

According to a small DC motor of the invention, an outside diameter of an armature assembly having a rotating element such as an armature core or an armature windings-molded element is made to be a value resulting when a necessary minimum air gap for the armature assembly to rotate smoothly is subtracted from an inside diameter of a motor frame so as to increase the outside diameter of the armature assembly to thereby increase the effective magnetic flux of the armature assembly, so that torque to be generated can be increased. In particular, when the armature assembly has an armature core, an outside diameter of the armature core is increased so as to increase the number of times of winding a winding around a pole formed between slots of the armature core to thereby increase the effective magnetic flux thereof, so that toque to be generated can be increased.

In addition, when the armature assembly has an armature windings-molded element, an outside diameter of the armature windings-molded element is increased so as to increase the number of times of winding an armature winding to thereby increase torque to be generated. In addition, an armature assembly of any shape can be used as an armature assembly that is to be incorporated in a motor frame having field magnets.

A reduction in the overall size of the motor can be accomplished without reducing the thickness of central portions of the poles of the field magnets by forming the shape of the motor frame into a quadrangular shape having the same number of corner portions as the number of polarized magnetic poles of the field magnets. Furthermore, the shape of the motor frame can be formed into a shape with 2(n+1) sides and angles, where n is a positive integer of 1 or larger.

Furthermore, since the armature assembly such as the armature core or the armature windings-molded element is allowed to be accommodated within a necessary minimum space by making the outside diameter of the armature assembly be the value resulting when one dimension of the minimum necessary air gap (as an actual dimension, an extremely short arbitrary dimension of the order of 0.1 mm to 0.5 mm) from the inside diameter of the motor frame, the size of the motor can be reduced.

The radius of an arc on the inside of the corner portion of the motor frame is set to any value in the range of 5% to 85% of a length from a center of the shaft to an arc-shaped surface on a shaft side of the field magnet. Preferably, the radius of the arc on the inside of the corner portion of the motor frame is set to any value in the range of 65% to 85% of the length from the center of the shaft to the arc-shaped surface on the shaft side of the field magnet.

By incorporating the field magnet configuration of the invention into a coreless motor or non-slotted cored motor, the size of the motor can be reduced and torque to be generated can be increased due to the aforesaid reason.

Specific means of the invention is described below.

(1) A small DC motor comprising: a motor frame comprising a cylindrical portion, the cylindrical portion having a constant thickness and having a cross section in a shape that comprises four sides and connecting portions, each of the connecting portions connecting adjacent two of the four sides and being located inward from a corresponding corner in a quadrangle comprising the four sides; field magnets having an arc-shaped surface on an inside thereof and having a cross section in an inside portion that has an arc-shape and in an outside portion that has conformable contact with an inside surface of the motor frame; and an armature assembly comprising: an armature winding and a shaft and being disposed rotatably within the motor frame, wherein the field magnets are provided so as to be spaced apart from each other, and the small DC motor comprises an air gap between each of the four sides and a radially outermost surface of the armature assembly, the air gap being a necessary minimum size to rotate the armature assembly.

(2) A small DC motor as described in item (1), wherein the armature assembly comprises an armature core, the armature core constituting the radially outermost surface of the armature assembly.

(3) A small DC motor as described in item (1), wherein the armature assembly comprises an armature windings-molded element, the armature windings-molded element constituting the radially outermost surface of the armature assembly.

(4) A small DC motor as described in any one of the items (1) to (3), wherein the field magnets comprise joining portions, each of the joining portions joining the inside portion of the field magnets to the outside portion of the field magnets and being disposed at the air gap.

(5) A small DC motor as described in any one of the items (1) to (4), which comprises a shaft, wherein a radius from a center of the shaft to the inside surface of the motor frame is the same as a radius from the center of the shaft to the arc-shaped surface of the field magnets.

(6) A small DC motor as described in any one of the items (1) to (4), wherein a radius from a center of a shaft to the inside surface of the motor frame is the same as a shortest radius from the center of the shaft to the arc-shaped surface of the field magnets, the arc-shaped surface having an arbitrary curvature.

(7) A small DC motor as described in any one of the items (1) to (4), wherein each of the connecting portions have an arc-shape.

(8) A small DC motor as described in any one of the items (1) to (4), wherein each of the connecting portions have an arc-shape, the arc-shape having an arbitrary ratio to a radius of the arc-shaped surface of the field magnets.

(9) A small DC motor as described in any one of the items (1) to (4), wherein each of the connecting portions has a straight line-shape.

(10) A small DC motor as described in any one of the items (1) to (4), wherein the cross section of the motor frame has an arc-shape, the arc-shape constituting a portion of a circle, and a center of the circle coincides with a center of the shaft.

(11) A small DC motor as described in any one of the items (3) to (10), wherein the armature assembly comprises: an armature windings-molded element of a cylindrical coil wound by a magnet wire; and an inner yoke comprising a cylindrical portion, the inner yoke being fixed in such a manner to face the armature windings-molded element.

(12) A small DC motor as described in any one of the items (3) to (10), wherein the armature assembly comprises: an armature windings-molded element of a cylindrical coil wound by a magnet wire; and a cylindrical movable back yoke having contact with an inner side of the armature windings-molded element.

The invention provides the following advantages.

Since the invention provides a small DC motor including: a motor frame including a cylindrical portion, the cylindrical portion having a constant thickness and having a cross section in a shape that includes four sides and connecting portions, each of the connecting portions connecting adjacent two of the four sides and being located inward from a corresponding corner in a quadrangle including the four sides; field magnets having an arc-shaped surface on an inside thereof and having a cross section in an inside portion that has an arc-shape and in an outside portion that has conformable contact with an inside surface of the motor frame; and an armature assembly including: an armature winding and a shaft and being disposed rotatably within the motor frame, wherein the field magnets are provided so as to be spaced apart from each other, and the small DC motor includes an air gap between each of the four sides and a radially outermost surface of the armature assembly, the air gap being a necessary minimum size to rotate the armature assembly, the outside diameter of an outermost side of the armature assembly can be made to be a value resulting when a necessary minimum air gap is subtracted from a shortest inside diameter of the motor frame. As a result, a radial length of the armature assembly can be increased, and this enables the extension of a winding space on the armature assembly, increase in torque to be generated, minimization of the quantity of expensive magnets to be used and reduction in size of the motor.

In the event that the armature assembly has the armature core, the length of slots formed in the armature core can be increased, and this enables the extension of a winding space between the slots, so as to increase the number of times of winding a winding in the slots to thereby increase torque to be generated. In addition, due to this, the winding space can be increased, and by maximizing the diameter of the armature core, the torque can be increased, thereby making it possible to minimize the quantity of expensive field magnets to be used and to reduce the size of the motor.

Since the air gap is determined by accuracies of two components, that is, the accuracy of the inside diameter of the motor frame and the accuracy of the outside diameter of the armature core, the air gap can be configured in an extremely short arbitrary dimension of the order of 0.1 mm to 0.5 mm as an actual dimension.

In the event that the armature assembly has the armature windings molded element, a radial length of the armature windings molded element can be increased, and this enables an increase in winding space, increase in torque to be generated, minimization of the quantity of expensive field magnets to be used, and reduction in size of the motor.

By forming the shape of the motor frame into a quadrangular shape having the same connecting portions (hereinafter also referred to as "corner portions") as the number of polarized magnetic poles of the field magnets, the reduction in the overall size of the motor can be accomplished without reducing the thickness of central portions of the magnetic poles of the field magnets. A basic shape of the motor frame is a quadrangular shape, and the shape of the cross section of the motor frame which results when corner portions of the quadrangular shape are collapsed inwardly while part of each of sides thereof is left intact is formed into a shape in which the adjacent sides of the quadrangular shape which are spaced apart from each other are connected by arcs of an arbitrary shape. The basic shape is not limited to the quadrangular shape but can be formed into a shape with 2(n+1) sides and angles, where n is a positive integer of 1 or larger. According to this configuration, the basic shape (the shape resulting before the corner portions are collapsed) of the cylindrical portion of the motor frame can be formed into, for example, a quadrangular shape, a hexagonal shape, an octagonal shape, . . . .

The radius of an arc on the inside of the corner portion of the motor frame is set to any value in the range of 5% to 85% of a length from the center of the shaft to an arc-shaped surface on a shaft side of the field magnet. According to this configuration, the armature core can be disposed with an enlarged construction without being restricted by the field magnets with respect to a location where the armature core is placed, and consequently, torque to be generated can be increased by increasing the number of times of winding the armature winding.

Preferably, the radius of the arc on the inside of the corner portion of the motor frame is set to any value in the range of 65% to 85% of the length from the center of the shaft to the arc-shaped surface on the shaft side of the field magnets.

BRIEF DESCRIPTION OF THE DRAWINGS

The invention disclosed herein will be understood better with reference to the following drawings of which:

FIGS. 1A to 1D are drawings which illustrate the configuration of a small DC motor according to Embodiment 1 of the invention;

DETAILED DESCRIPTION OF THE INVENTION

Figure 2A:
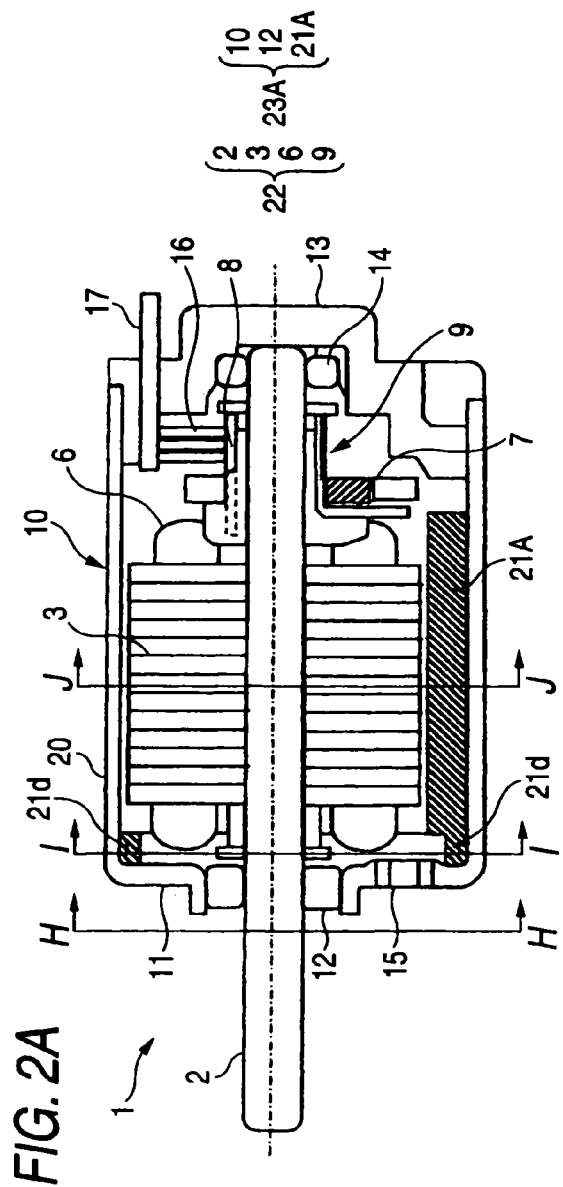
FIGS. 2A to 2D are drawings which illustrate the configuration of a small DC motor according to Embodiment 2 of the invention.

Exemplary embodiments of the invention will be described in detail based on the accompanying drawings.

Embodiment 1

FIGS. 1A to 1D are drawings which illustrate the configuration of a small DC motor according to Embodiment 1 of the invention. In Embodiment 1, a case will be described in which an armature assembly has an armature core.

FIG. 1A is a sectional view taken along a longitudinal direction of a shaft, and in FIG. 1A, a segment from line A-A to line B-B is a sectional view taken along line D-D in FIG. 1B, a segment from line B-B to line C-C is a sectional view taken along line E-E in FIG. 1C, and a segment from line C-C to an end block is a sectional view taken along line F-F in FIG. 1D. FIG. 1B is a sectional view taken along line A-A in FIG. 1A, FIG. 1C is a sectional view taken along line B-B in FIG. 1A, and FIG. 1D is a sectional view taken along line C-C in FIG. 1A.

A small DC motor 1 illustrated in FIG. 1A has an armature assembly 22 and a frame assembly 23.

The armature assembly 22 has a shaft 2, an armature core 3 provided on the shaft 2, armature windings 6 wound in slots 5 formed on both sides of salient poles 4 on the armature core 3, and a commutator unit 9 provided on the shaft 2.

A current-limiting varistor 7 is installed and a commutator piece 8 is provided on the commutator unit 9 provided on the shaft 2. One end of the shaft 2 is rotatably supported in a bearing 12 mounted in a central opening hole in an end plate portion 11 of a motor frame 10, and the other end thereof is rotatably supported in a bearing 14 mounted in an end block 13. Mounting threaded holes 15 are symmetrically provided in the end plate portion 11 with respect to the shaft 2. A terminal 17 having a brush 16 is provided in the end block 13. The brush 16 is disposed at a position where it contacts the commutator piece 8.

The motor frame 10 is made up of a cylindrical portion 20 which has a constant thickness and which has a cross section in a shape that includes four sides 18 and corner portions 19, each of the corner portions 19 connecting adjacent two of the four sides 18 and being located inward from a corresponding corner in a quadrangle including the four sides 18, that is, the shape of the cross section is formed into a shape having a cross section resulting when corner portions 19 of a quadrangular shape are collapsed inwardly while part of each of sides 18 of the quadrangular shape is left intact and the end plate portion 11 which is provided continuously to the cylindrical portion 20. When viewed in cross section, the cylindrical portion 20 is such that the adjacent but spaced-apart sides 18 are connected by arc-shapes (hereinafter also referred to as "arcs").

By forming the shape of the cylindrical portion 20 of the motor frame 10 into basically a quadrangular shape having the same number of corner portions as the number of polarized magnetic poles of field magnets 21, a configuration to obtain sinusoidal magnetization characteristics in a rotating direction can be accomplished without reducing the thickness of central portions of the magnetic poles of the field magnets, thereby making it possible to reduce the size of the motor.

The outside diameter of the armature core 3 is set to the inside diameter of the cylindrical portion 20 of the motor frame 10 such that only a necessary minimum air gap G exists at a position where an outside surface of the armature core 3 comes nearest to an inside surface 10a of the cylindrical portion 20 of the motor frame 10, that is, at a position of a central portion of each side 18 in the event of Embodiment 1. In the example illustrated in FIG. 1, this setting is carried out at the central portion of each side 18.

The air gap G is determined by accuracies of two components, that is, the accuracy of an inside diameter of the motor frame 10 and the accuracy of an outside diameter of the armature core 3. Due to this, the air gap G takes a value of the order of 0.1 mm to 0.5 mm as an actual dimension.

The radius of an arc on an inside of the corner portion 19 of the motor frame 10 is set to any value from 5% to 85% of a length from a center of the shaft 2 to an arc-shaped surface of an inside portion 21a of the field magnet 21 which lies on a shaft 2 side thereof. According to this configuration, the armature core 3 can be disposed as being enlarged in construction without being restricted by the field magnets 21 with respect to a location where the armature core 3 is disposed, and consequently, the number of times of winding the armature winding 6 can be increased so as to increase torque to be generated. Preferably, the radius of the arc on the inside of the corner portion 19 of the motor frame 10 is set to any value from 65% to 85% of the length from the center of the shaft 2 to the arc-shaped surface of the inside portion 21a of the field magnet 21 which lies on the shaft 2 side thereof.

The embodiment includes the following preferred features.

The radius from the center of the shaft 2 to the inside surface 10a of the motor frame 10 is the same as a radius from the center of the shaft 2 to the arc-shaped surface of the inside portion 21a of the field magnets 21.

In addition, the radius from the center of the shaft 2 to the inside surface 10a of the motor frame 10 is the same as a shortest radius from the center of the shaft 2 to an arc-shaped surface of the inside portion 21a of the field magnets 21 which has an arbitrary curvature.

Additionally, each of the connecting portions 19 has an arc-shape, that is, the cross section of the motor frame 10 which results when the corner portions 19 of the motor frame 10 are collapsed inwardly while part of each of the sides 18 of the quadrangular shape is left intact is formed into a shape in which the adjacent sides 18 of the quadrangular shape which are spaced apart from each other are connected by arcs of an arbitrary shape.

In addition, each of the connecting portions 19 has an arc-shape, the arc-shape having an arbitrary ratio of a radius of the arc-shaped surface of the field magnets 21, that is, the cross section of the motor frame 10 which results when the corner portions 19 of the motor frame 10 are collapsed inwardly while part of each of the sides 18 of the quadrangular shape is left intact is formed into a shape in which the adjacent sides 18 of the quadrangular shape which are spaced apart from each other are connected by arcs of any ratio to the length of a radius of an arc (having a radius from the center of the shaft 2 to the arc-shaped surface of the field magnet) which forms the arc-shaped surface.

Additionally, each of the connecting portions 19 has a straight line-shape, that is, the cross section of the motor frame 10 which results when the corner portions 19 of the motor frame 10 are collapsed inwardly while part of each of the sides 18 of the quadrangular shape is left intact is formed into a shape in which the adjacent sides 18 of the quadrangular shape which are spaced apart from each other are connected by straight lines.

In addition, the cross section of the motor frame 10 which results when the corner portions 19 of the motor frame 10 are collapsed inwardly while part of each of the sides 18 of the quadrangular shape is left intact is formed into a shape in which the adjacent sides 18 of the quadrangular shape which are spaced apart from each other are connected by arcs of a concentric circle with respect to the center of the shaft 2. The end block 13 is mounted on an open end of the cylindrical portion 20 which lies opposite to the end plate portion 11 of the motor frame 10.

The frame assembly 23 is made up of the motor frame 10, the bearing 12 and the field magnets 21.

The field magnet 21 is made of, for example, a neodymium magnet (Nd—Fe—B) or the like and is magnetized in a radial direction or rotating direction, and the field magnets are disposed in four respectively at the corner portions 19 of the cylindrical portion 20 having the quadrangular cross section in such a manner as to be spaced apart from each other.

A cross section of the field magnet 21 (a cross section of a plane which intersects the longitudinal direction of the shaft 2 at right angles) is formed into a shape in which the inside portion (the side which lies closer to the armature core 3) 21a is formed into an arc-shape, while an outside portion 21b is made to firmly secure to the inside surface 10a of the cylindrical portion 20 of the motor frame 10. A joining portion 21c between the inside portion 21a and the outside portion 21b is formed at an angle at which the outside portion 21b intersects the inside surface 10a of the motor frame 10 in Embodiment 1, but the joining portion 21c can also be formed at any angle to the inside surface 10a of the motor frame 10. The field magnet 21 has within the air gap G defined between the inside surface 10a of the motor frame 10 and a radially outermost surface of the armature core 3 such joining portions 19 which connect, respectively, the inside portion 21a of the field magnet 21 which is formed into the arc-shape as viewed in cross section and the outside portion 21b thereof which firmly secures to the inside surface 10a of the motor frame 10 as viewed in cross section. The field magnet 21 is, as illustrated in FIG. 1A, disposed in the longitudinal direction of the cylindrical portion 20 in such a manner as to face the armature core 3.

In particular, in the small DC motor 1, in order to optimize a relationship between a maximum energy product (BH) max of the field magnet 21 which largely affects the motor properties and the outside diameter dimension of the armature core 3 which makes up a magnetism forming portion of the rotating element, by increasing the outside diameter of the armature core 3 to a value resulting when the necessary minimum air gap G is subtracted from the inside diameter of the cylindrical portion 20 of the motor frame 10, the effective magnetic flux per slot of the armature core 3 can be increased, and furthermore, a winding region in the slots 5 of the armature core 3 can be increased, and the quantity of field magnets 21 to be used, which are expensive as a motor component, can be suppressed, whereby torque to be generated is increased while realizing the reduction in dimensions of the motor, so that the reduction in the cost and volume of the motor is realized.

In the event that a magnet having a large maximum energy product is used, the optimization of dimensions of the magnet is required in consideration of countermeasures against cogging torque, and the invention exhibits tremendous effect on the solution of a problem relating to the cogging torque.

Embodiment 2

FIGS. 2A to 2D are drawings which illustrate the configuration of a small DC motor according to another embodiment of the invention.

Figure 2D:
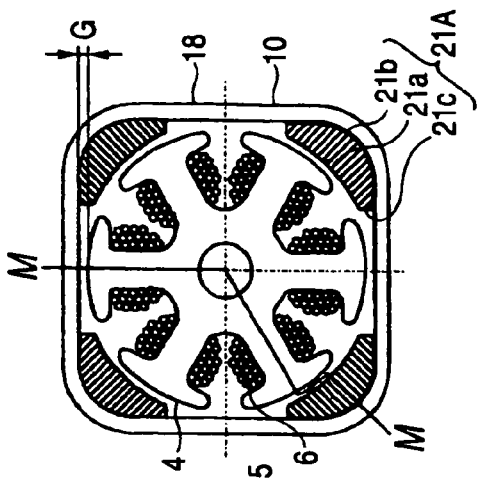
Figure 2C:
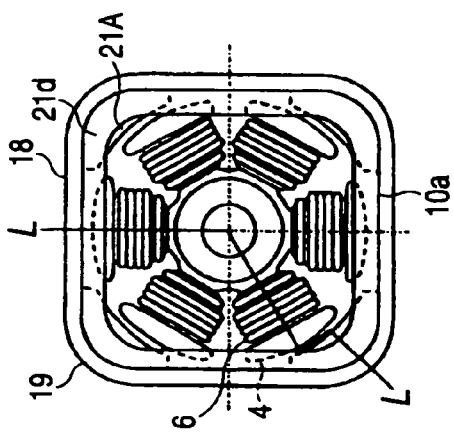
Figure 2B:
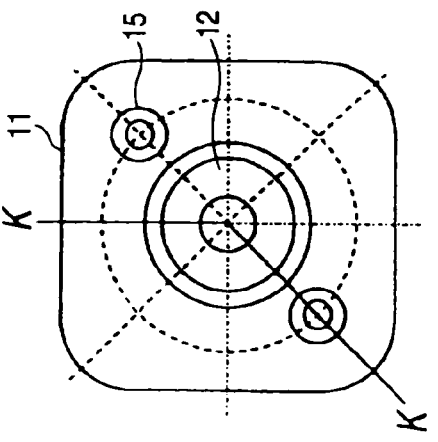

FIG. 2A is a sectional view taken along a longitudinal direction of a shaft, and in FIG. 2A, a segment from line H-H to line I-I is a sectional view taken along line K-K in FIG. 2B, a segment from line I-I to line J-J is a sectional view taken along line L-L in FIG. 2C, and a segment from line J-J to an end block is a sectional view taken along line M-M in FIG. 2D.

FIG. 2B is a sectional view taken along line H-H in FIG. 2A, FIG. 2C is a sectional view taken along line I-I in FIG. 2A, and FIG. 2D is a sectional view taken along line J-J in FIG. 2A.

FIG. 2 has the same constituent elements except for field magnets as those of FIG. 1. Like reference numerals are given to like constituent elements, and the description thereof will be omitted.

A small DC motor 1 illustrated in FIG. 2A has an armature assembly 22 and a frame assembly 23A.

The frame assembly 23A is made up of a motor frame 10, a bearing 12 and field magnets 21A which are connected together by a connecting frame portion 21d.

As illustrated in FIG. 2D, the field magnet 21A is formed so as to have, as viewed in cross section, an inside portion 21a on which an arc-shaped surface is formed with a radius from a center of a shaft 2 and an outside portion 21b which is formed so as to firmly secure to an inside surface 10a of the motor frame 10. The field magnet 21A is configured so as to have joining portions 21c which each connect, as viewed in cross section, the inside portion 21a and the outside portion 21b thereof within an air gap G defined between the inside surface 10a of the motor frame 10 and an outside surface of an armature core 3. The field magnets 21A are disposed in four in a cylindrical portion 20 of the motor frame 10 which has across section in a shape that comprises four sides and connecting portions, each of the connecting portions connecting adjacent two of the four sides and being located inward from a corresponding corner in a quadrangle comprising the four sides, that is, a cross section resulting when corner portions 19 of a quadrangular shape are collapsed inwardly while part of each of sides 18 of the quadrangular shape is left intact, the four field magnets 21A being disposed respectively in the resulting corner portions 19 in such a manner as to be spaced apart from each other.

In particular, in the small DC motor 1, in a relationship between a maximum energy product (BH)max of the field magnet 21A which largely affects the motor properties and an outside diameter of the armature core 3 which makes up a magnetism forming portion of the rotating element, by increasing the outside diameter of the armature core 3 to a value resulting when a necessary minimum air gap G is subtracted from an inside diameter of the motor frame 10, the effective magnetic flux per slot of the armature core 3 can be increased, and furthermore, a winding region in the slots 5 of the armature core 3 can be increased, and the quantity of field magnets 21A to be used, which are expensive as a motor component, can be suppressed, whereby torque to be generated is increased while realizing the reduction in dimensions of the motor, and the number of man-hours for assembling the motor can be reduced by integrating the field magnet 21A into one piece, so that the reduction in the cost and volume of the motor is realized.

As illustrated in FIGS. 2A and 2C, the connecting frame portion 21d is configured substantially into a quadrangular shape along the inside surface 10a of the cylindrical portion 20 of the motor frame 10. The connecting frame portion 21d is provided in such a manner as to be in contact with an end plate portion 11 and the cylindrical portion 20.

Embodiment 3

Figure 3B:
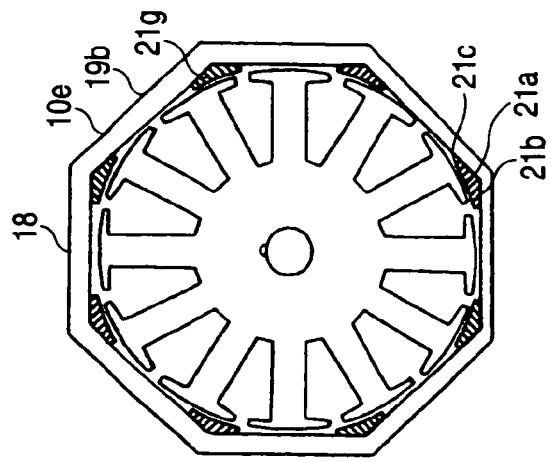
FIGS. 3A to 3C are drawings which illustrate the configuration of a small DC motor according to a further embodiment of the invention.
Figure 3C:
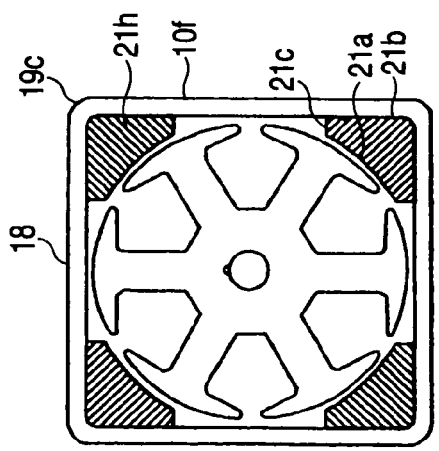
Figure 3A:
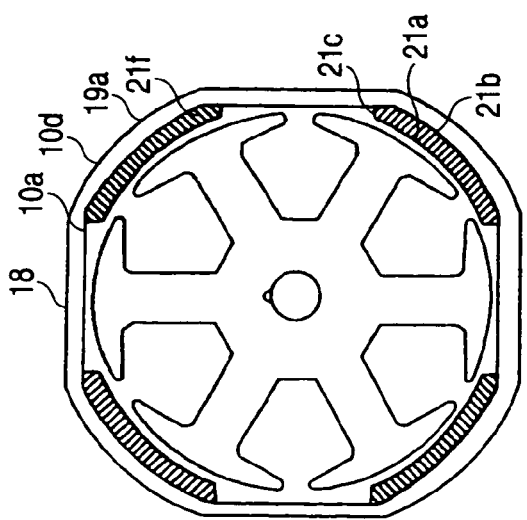

FIGS. 3A and 3B are drawings which illustrate the configuration of a small DC motor 1 according to a further embodiment of the invention. In addition, armature windings are omitted from the drawing. FIG. 3A is a sectional view which illustrates a cross section of a motor frame having a plurality of curved surfaces for 4 poles and 6 slots, FIG. 3B is a sectional view which illustrates across section of an octagonal motor frame for 8 poles and 12 slots, and FIG. 3C is a sectional view which illustrates a cross section of a square motor frame for 4 poles and 6 slots.

(Shapes of Motor Frame)

The motor frames of the aforesaid embodiments take the quadrangular shape as the basic shape thereof and are formed into the shape in which in the cross section of the motor frame resulting when the corner portions are collapsed inwardly while part of each of the sides of the quadrangular shape is left intact, the adjacent but spaced-apart sides of the motor frame are connected by the arcs of an arbitrary shape or the like, the basic shape is not limited to the quadrangular shape but can be formed into a shape with 2(n+1) sides and angles, where n is a positive integer of 1 or larger. According to this configuration, the basic shape (the shape resulting before the corner portions are collapsed) of the cylindrical shape can be formed into, for example, a quadrangular shape, a hexagonal shape, an octagonal shape, . . . .

In the small DC motor 1 of the invention, the shape of the cross section of the motor frame which results when corner portions 19a of the quadrangular shape are collapsed inwardly while part of each of sides 18 thereof is left intact may be formed into a shape in which the adjacent sides 18 of the quadrangular shape which are spaced apart from each other are connected by arcs of an arbitrary shape, the shape of the cross section of the motor frame which results when the corner portions 19a of the quadrangular shape are collapsed inwardly while part of each of the sides 18 thereof is left intact may be formed into a shape in which the adjacent sides of the quadrangular shape which are spaced apart from each other are connected by arcs of arbitrary ratio to the length of a radius of an arc which forms the arc-shaped surface, the shape of the cross section of the motor frame which results when the corner portions 19 of the quadrangular shape are collapsed inwardly while part of each of the sides 18 thereof is left intact may be formed into a shape in which the adjacent sides of the quadrangular shape which are spaced apart from each other are connected by straight lines, or the shape of the cross section of the motor frame which results when the corner portions 19 of the quadrangular shape are collapsed inwardly while part of each of the sides 18 thereof is left intact may be formed into a shape with 2(n+1) sides and angles, where n is a positive integer of 1 or larger. The radius of an arc on an inside of a field magnet 21f as viewed in cross section is made to continue to be extended so that the arc is made to be becoming almost a straight line, for example, whereby the magnetization characteristics in the rotating direction of the field magnet 21f can be formed into sinusoidal shape.

Also in examples illustrated in FIGS. 3A to 3C, the field magnet 21f has joining portions 21c which each connect, as viewed in cross section, an inside portion 21a of the field magnet 21f which is formed into an arc-shape and an outside portion 21b thereof which is provided so as to firmly secure to an inside surface 10a of a motor frame 10 within an air gap G defined between the inside surface of the motor frame 10 and a radially outermost surface of an armature core 3.

In addition, the shape of the armature core can be altered appropriately. While in this embodiment, the armature core is configured as having 4 poles and 6 slots, the armature core can be configured as having 4 poles and 5 slots.

In the example illustrated in FIG. 3A, as illustrated in a cross section therein, a motor frame 10*d* is configured based on a circular shape on the whole by increasing the radius of arcs of the corner portions 19*a* of the motor frame 10 while part of each side 18 thereof is left intact. Field magnets 21*f* are each configured such that an inside portion 21*a* is formed into an arc-shaped surface while an outside portion 21*b* is made to firmly secure to an inside surface 10*a* of the motor frame 10*d* and are provided respectively at the corner portions 19*a* of the motor frame 10*d* in such a manner as to be spaced apart from each other so that the field magnets 21*f* do not obstruct the rotating operation of the armature core 3, whereby the field magnets 21*f* are each formed into a shape which can secure magnetization characteristics of each magnet necessary to maintain the motor properties.

In the example illustrated in FIG. 3B, as illustrated in a cross section therein, there is provided a motor shape for 8 poles and 12 slots, and the cross section of a motor frame 10*e* which results when corner portions 19*b* of a quadrangular shape are collapsed inwardly while part of each side 18 thereof is left intact is formed into an irregular octagon with the straight sides 18 kept remaining. Field magnets 21*g* are each configured such that an inside is formed into an arc-shaped surface while an outside is made to firmly secure to an angle formed by two straight lines of the motor frame 10*e* and are provided respectively at the corner portions 19*b* of the motor frame 10*e* in such a manner as to be spaced apart from each other so that the field magnets 21*g* do not obstruct the rotating operation of the armature core 3, whereby the field magnets 21*g* are each formed into a shape which can secure magnetization characteristics of each magnet necessary to maintain the motor properties.

In the example illustrated in FIG. 3C, as illustrated in a cross section therein, the radius (the corner R) of corner portions (corners) 19*c* of four sides 18 of a motor frame 10*f* is set such that a ratio of the radius of the corner R to an inner radius of an arc-shaped surface of a field magnet 21*h* (a radial length from the center of a shaft 2 to the arc-shaped surface of the field magnet) falls within a range from 5% to 85%. Preferably, the radius of the arc of the individual corner portions of the motor frame is set to any value in the range of 65% to 85% of the length from the center of the shaft 2 to the arc-shaped surface of the field magnet which lies on a shaft side thereof.

The field magnets 21*h* are each configured such that the inside portion 21*a* is formed into an arc-shaped surface while the outside portion 21*b* is made to firmly secure to the motor frame 10*f* and are provided respectively at the corner portions 19*c* of the motor frame 10*f* in such a manner as to be spaced apart from each other so that the field magnets 21*h* do not obstruct the rotating operation of the armature core 3, whereby the field magnets 21*h* are each formed into a shape which can secure magnetization characteristics of each magnet necessary to maintain the motor properties.

Embodiment 4

Figure 4A:
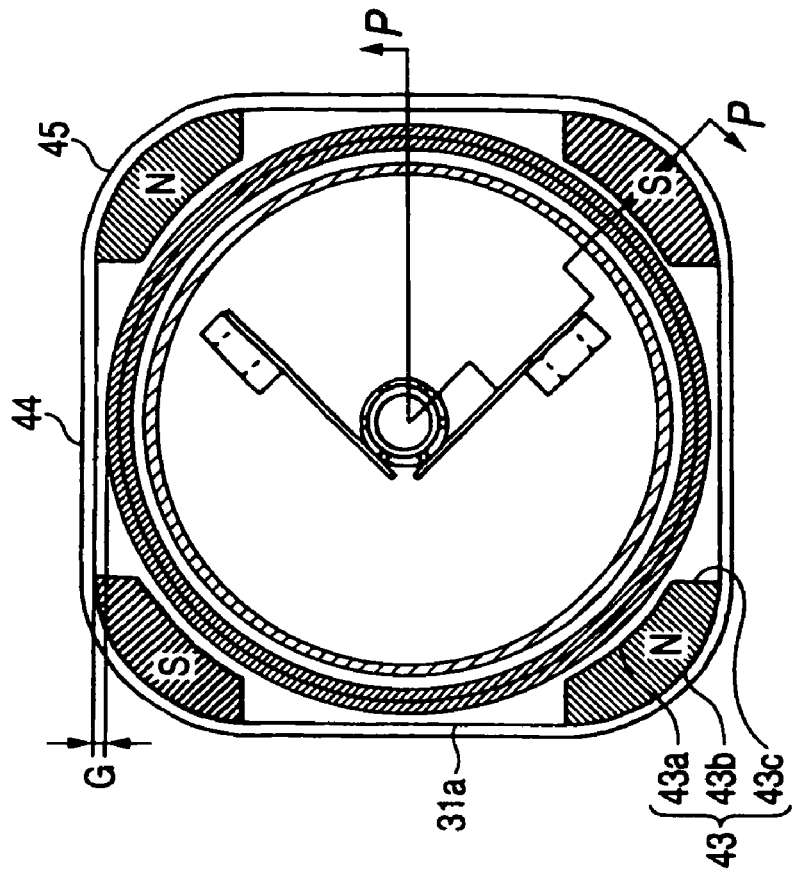
FIGS. 4A and 4B each are sectional views of a coreless motor to which the configuration of the field magnets of the invention is applied.
Figure 4B:
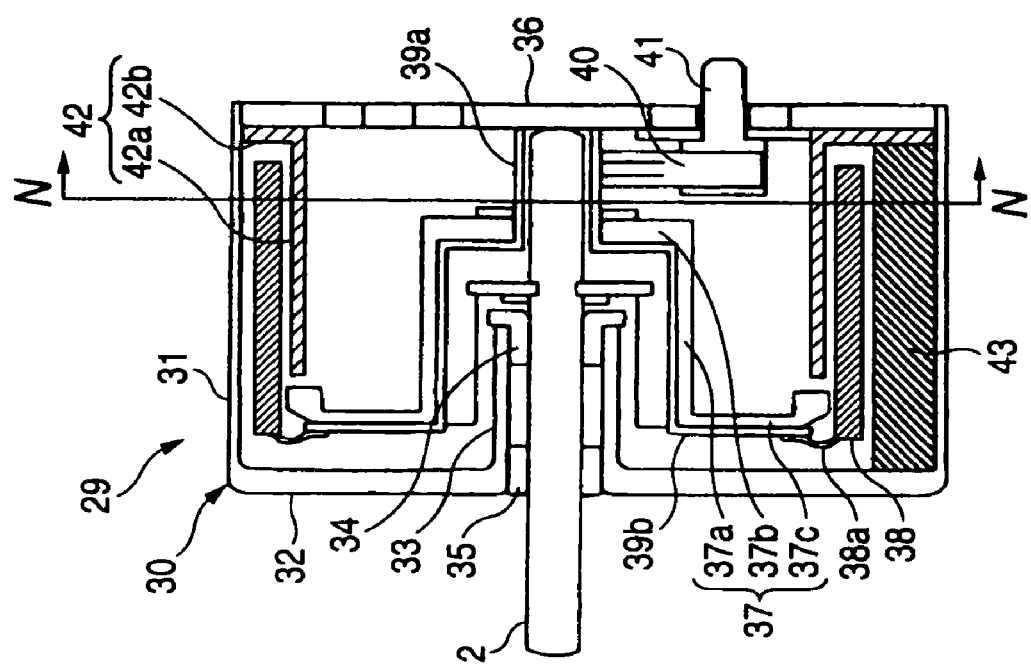

FIGS. 4A and 4B are sectional views which illustrate a coreless motor to which the magnet configuration of the invention is applied.

FIG. 4A is a sectional view taken along line P-P in FIG. 4B, and FIG. 4B is a sectional view taken along line N-N in FIG. 4A. A coreless motor 29 of the invention is involved in the scope of the small DC motor of the invention.

The coreless motor 29 includes an armature assembly rotatably disposed within a motor frame 30, the motor frame 30 including a commutator mold 37, an armature windings-molded element 38 and a shaft 2.

The motor frame 30 of the coreless motor 29 is made up of a cylindrical portion 31, an end plate portion 32 which is provided continuously to the cylindrical portion 31, and a bearing support portion 33 which is provided continuously to the endplate portion 32. In an interior of the bearing support portion 33, the shaft 2 is rotatably supported by two bearings 34, 35 which are separated from each other so as to be provided at upper and lower ends of the bearing support portion 33, respectively. One end of the shaft 2 is brought into abutment with a bottom plate 36. The commutator mold 37 is provided on the shaft 2.

The commutator mold 37 is made up of a cylindrical portion 37*a* which is made of resin and is provided in such a manner as to surround the circumference of the bearing support portion 33 of the motor frame 30, an inner annular plate portion 37*b* which is provided continuously to an end of the cylindrical portion 37*a* and is fixed to the shaft 2 and an outer annular plate portion 37*c* which is provided on the other end of the cylindrical portion 37*a* in such a manner as to protrude radially outwardly therefrom, and a commutator piece 39*a* and a riser 39*b* which continues to the commutator piece 39*a* to constitute a feeding path to the armature winding-molded element 38 are partially molded in the commutator mold 37 in such a manner as to be embedded integrally therewith. A radially outside of the riser 39*b* electrically connects to and supports with a required strength the armature winding-molded element 38 via a tap 38*a* made of a metallic elongated piece. A pair of brushes 40, which are to be brought into contact the commutator piece 39*a*, are mounted on a terminal 41 fixed to the bottom plate 36.

The armature winding-molded element 38 takes a configuration in which a coil into which a magnet wire is wound is formed into a thin cylindrical shape and is then fixed with a resin, taking in the tap 38*a* on its way to the top so as to connect to the riser 39*b* via the tap 38*a*. An inner yoke 42 and field magnets 43 are disposed on a stationary side in such a manner as to hold the armature winding-molded element 38 on a rotating side therebetween. The inner yoke 42 is made up of a cylindrical portion 42*a* which faces the armature winding-molded element 38 and a bent portion 42*b* which is disposed on the bottom plate 36. The field magnets 43 are disposed respectively at corner portions 45 which connect together individual sides 44 of the motor frame 30 in such a manner as to be spaced apart from each other.

The cylindrical portion 42*a* of the inner yoke 42 short-circuits magnetic flux generated in the field magnets 43 to thereby lower leakage flux.

The motor frame 30 is made up of the cylindrical portion 31 which has a constant thickness and which is formed into a shape having across section resulting when corner portions 45 of a quadrangular shape are collapsed inwardly while part of each of the sides 44 of the quadrangular shape is left intact, the end plate portion 32 which is provided continuously to the cylindrical portion 31 and the bearing support portion 33 which is provided continuously to the end plate portion 32. In the cross section of the cylindrical portion 31, the sides 44 are connected to each other by arcs at the corner portions 45. The bearing support portion 33 is formed into a cylindrical shape.

The reduction in size of the motor can be achieved without reducing the thickness of central portions of poles of the field magnets 43 by forming the shape of the cylindrical portion 31 of the motor frame 30 basically into a quadrangular shape which has the same number of corner portions as the number of polarized magnetic poles of the field magnets 43.

The outside diameter of the armature winding-molded element 38 is set to the inside diameter of the cylindrical portion 31 of the motor frame 30 such that only a necessary minimum air gap G is provided at a position where a radially outermost surface of the armature winding-molded element 38 comes nearest to a radially innermost surface of the cylindrical portion 31, that is, at a position of a central position of each side in the event of this embodiment. In the example illustrated in FIG. 4, this setting is carried out at the central portion of each side 44.

The air gap G is determined mainly by accuracies of two constituent components, that is, the accuracy of the inside diameter of the motor frame 30 and the accuracy of the outside diameter of the armature winding-molded element 38. Due to this, the air gap G takes a value of the order of 0.1 mm to 0.5 mm as an actual dimension.

The radius of the arc on an inside of the corner portion 45 is set to any value in the range of 5% to 85% of a length from the center of the shaft 2 to an arc-shaped surface of an inside portion 43a of the field magnet 43 which lies on a shaft 2 side thereof, whereby the armature winding-molded element 38 can be disposed as being enlarged in diameter without being restricted by the field magnets 43 with respect to a location where it is disposed, and consequently, the number of times of winding an armature winding can be increased so as to increase torque to be generated. Preferably, the radius of the arc on the inside of the corner portion 45 of the motor frame 30 is set to any value in the range of 65% to 85% of the length from the center of the shaft 2 to the arc-shaped surface of the inside portion 43a of the field magnet 43 which lies on the shaft 2 side thereof.

The field magnets 43 are made of, for example, neodymium magnets (Nd—Fe—B) or the like, are magnetized in a radial direction or rotating direction, and are disposed at the corner portions 45 of the cylindrical portion 31 having the quadrangular cross section in such a manner as to be spaced apart from each other.

The cross section of the field magnet 43 is formed into a shape in which an inside portion 43a (a side which lies close to the armature winding-molded element 38) exhibits an arc-shape formed with a radius from the center of the shaft 2, while an outside portion 43b is made to firmly secure to an inside surface 31a of the cylindrical portion 31 of the motor frame 30. A joining portion 43c between the inside portion 43a and the outside portion 43b is formed at an angle at which it intersects the inside surface 31a of the cylindrical portion 31 of the motor frame 30 at right angles, but the joining portion 43c can also be formed at an arbitrary angle.

The field magnet 43 has the joining portions 43c which each connect together, as viewed in cross section, the inside portion 43a of the field magnet 43 which is formed into the arc-shape and the outside portion 43b thereof which is made to firmly secure to the inside surface 31a of the motor frame within the air gap G defined between the inside surface 31a of the motor frame 30 and the radially outermost surface of the armature winding-molded element 38.

In particular, in a small DC motor 1, in order to optimize a relationship between a maximum energy product (BH) max of the field magnet 43 which largely affects the motor properties and the outside diameter dimension of the armature winding-molded element 38 which makes up a magnetism forming portion of the rotating element, by increasing the outside diameter of the armature winding-molded element 38 to a value resulting when the necessary minimum air gap G is subtracted from the inside diameter of the cylindrical portion 31 of the motor frame 30, the effective magnetic flux of the armature winding-molded element 38 can be increased, and furthermore, a winding region of the armature winding-molded element 38 can be increased, and the quantity of field magnets 43 to be used, which are expensive as a motor component, can be suppressed, whereby torque to be generated is increased while realizing the reduction in dimensions of the motor, so that the reduction in the cost and volume of the motor is realized.

The configuration of the motor frame 30 and the field magnets 43 can be altered variously as has been described above.

In the coreless motor 29 of Embodiment 4, since the outside diameter of the armature winding-molded element 38 is set to the inside diameter of the cylindrical portion 31 of the motor frame 30 such that only the necessary minimum air gap G is provided at the position where the radially outermost surface of the armature winding-molded element 38 comes nearest to the radially innermost surface of the cylindrical portion 31, that is, at the position of the central position of each side in the event of Embodiment 4, the radial length of the armature winding-molded element 38 can be increased, and due to this, the winding space can be increased, so that the diameter of the armature winding-molded element 38 can be maximized to increase torque to be generated, while minimizing the quantity of expensive field magnets 43 to be used, whereby the size of the motor can be reduced.

In addition, since the shape of the cylindrical portion 31 of the motor frame 30 is formed into the quadrangular shape which has the same number of corner portions as the number of polarized magnetic poles of the field magnets 43, the size of the motor can be reduced without reducing the thickness of the central portions of the poles of the field magnets 43 which accomplishes the sinusoidal magnetization characteristics.

Additionally, since the shape of the commutator mold 37 is made up of the cylindrical portion 37a which is provided in such a manner as to surround the circumference of the bearing support portion 33 of the motor frame 30, the inner annular plate portion 37b which is provided continuously to the end of the cylindrical portion 37a and is fixed to the shaft 2 and the outer annular plate portion 37c which is provided on the other end of the cylindrical portion 37a in such a manner as to protrude radially outwardly therefrom, the two bearings 34, 35 can be provided in such a manner as to be spaced apart from each other for stable support while securing a contact space between the commutator piece 39a and the brushes 40, so as to provided an advantage where the cylindrical portion 42a of the inner yoke 42 can be formed long in the axial direction.

A resin reinforcement film can be provided on outside surfaces of the outer annular plate portion 37c and the armature winding-molded element 38 so as to make up a vibration-proof construction. The tap 38a and the riser 39b are connected together by welding. The tap 38a is formed into a strip-like shape and a curved portion is provided on part thereof in order to impart elasticity.

Since the field magnets 43 and the inner yoke 42 are provided to face each other while holding the armature winding-molded element 38 therebetween, a magnetic path (mainly the inner yoke) of a magnetic material can be provided long, and the magnetic resistance of the magnetic path can be suppressed to a lower level, thereby making it possible to suppress the reduction in flux density. In addition, needless to say, cogging torque can also be suppressed.

Embodiment 5

Figure 5:
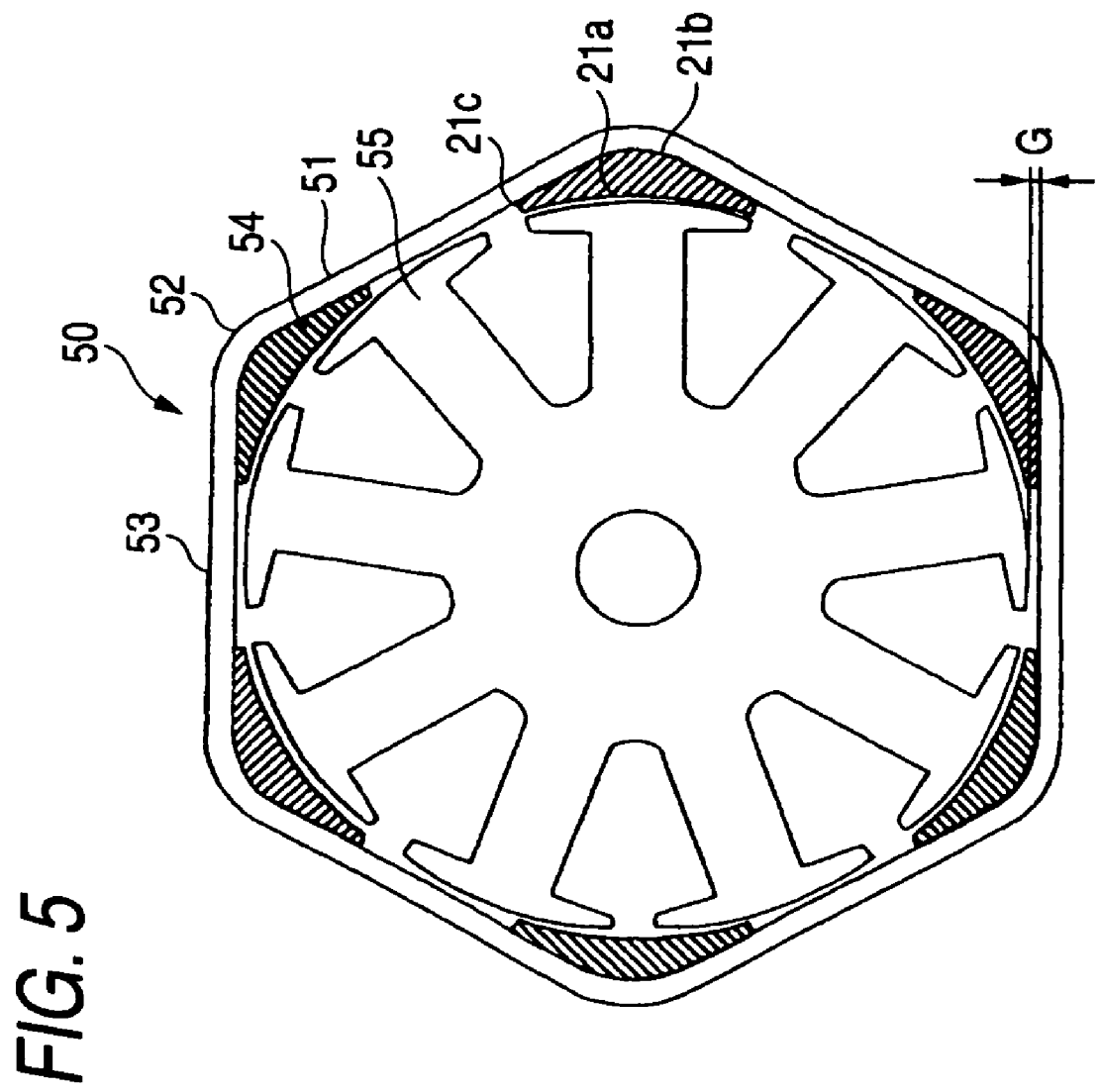
FIG. 5 is a sectional view of a small DC motor having another shape of the motor frame of the invention.

FIG. 5 is a cross section of a small DC motor having a further motor frame shape.

While the basic shapes of the motor frames which have been described in the aforesaid embodiments are the quadrangular shape, and the shape of the cross section of the motor frame 10 which results when the corner portions 19 of the quadrangular shape are collapsed inwardly while part of each of the sides 18 thereof is left intact is formed into the shape in which the adjacent sides 18 of the quadrangular shape which are spaced apart from each other are connected by the arc of any shape, the basic shape is not limited to the quadrangular shape but can be formed into a shape with 2(n+1) sides and angles, where n is a positive integer of 1 or larger. According to this configuration, the basic shape (the shape resulting before the corner portions are collapsed) of the cylindrical portion of the motor frame can be formed into, for example, a quadrangular shape, a hexagonal shape, an octagonal shape, . . . .

An example depicted in FIG. 5 illustrates a hexagonal motor frame 50 which result when n is 2. The motor frame is formed in 6 poles and 9 slots. A cylindrical portion 51 of the hexagonal motor frame 50 is formed such that a cross section of the motor frame 50 which results when corner portions 52 of the hexagonal shape are collapsed inwardly while part of each of sides 53 thereof is left intact is formed into a shape in which any pair of the adjacent sides 53 of the motor frame 50 which are spaced apart from each other are connected by an arc having an arbitrary ratio to the length of the radius of an arc which forms an arc-shaped surface on an inside portion 21a of a field magnet 54. In addition, the cross section may be formed into a shape in which the adjacent sides 53 are so connected by a straight line.

The radius (the corner R) of the corner portion 52 of each side 53 of the motor frame 50 is set such that a ratio of the radius of the corner R to an inner radius of an arc-shaped surface of the field magnet 54 (a radial length from the center of a shaft 2 to the arc-shaped surface of the field magnet) falls within the range of 5% to 85%. Preferably, the radius of the arc of the individual corner portions of the motor frame is set to any value in the range of 65% to 85% of the length from the center of the shaft 2 to the arc-shaped surface of the field magnet which lies on a shaft side thereof.

The field magnets 54 are each configured such that the inside portion 21a is formed into an arc-shaped surface while an outside portion 21b is made to firmly secure to the motor frame 50 and are provided respectively at the corner portions 52 of the motor frame 50 in such a manner as to be spaced apart from each other so that the field magnets 54 do not obstruct the rotating operation of an armature core 55, whereby the field magnets 54 are each formed into a shape which can secure magnetization characteristics of each magnet necessary to maintain the motor properties.

The field magnet 54 has joining portions 21c which each connect together, as viewed in cross section, the inside portion 21a of the field magnet 54 which is formed into the arc-shape and the outside portion 21b thereof which is made to firmly secure to the motor frame 50 within an air gap G defined between the inside surface of the motor frame 50 and a radially outermost surface of the armature core 55. In addition, the shape of the armature core 55 can be altered appropriately.

Embodiment 6

Figure 6A:
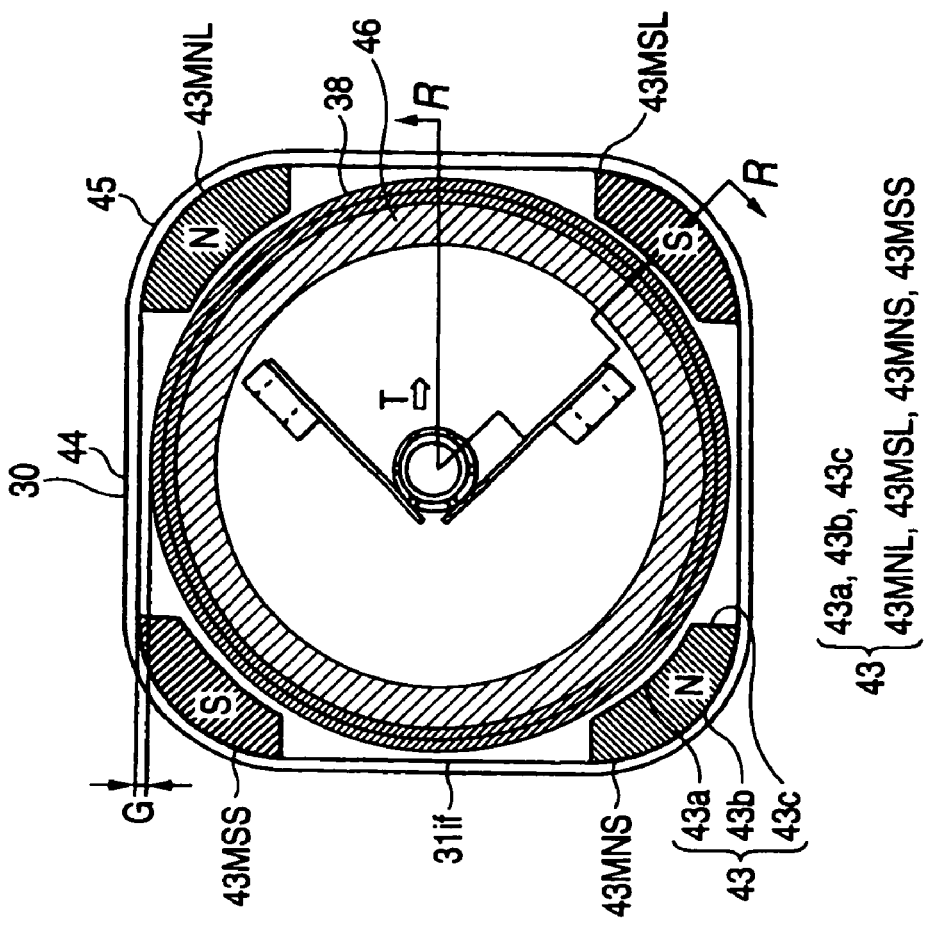
FIGS. 6A and 6B each are sectional views of a slotless cored motor to which the configuration of the field magnets of the invention is applied.
Figure 6B:
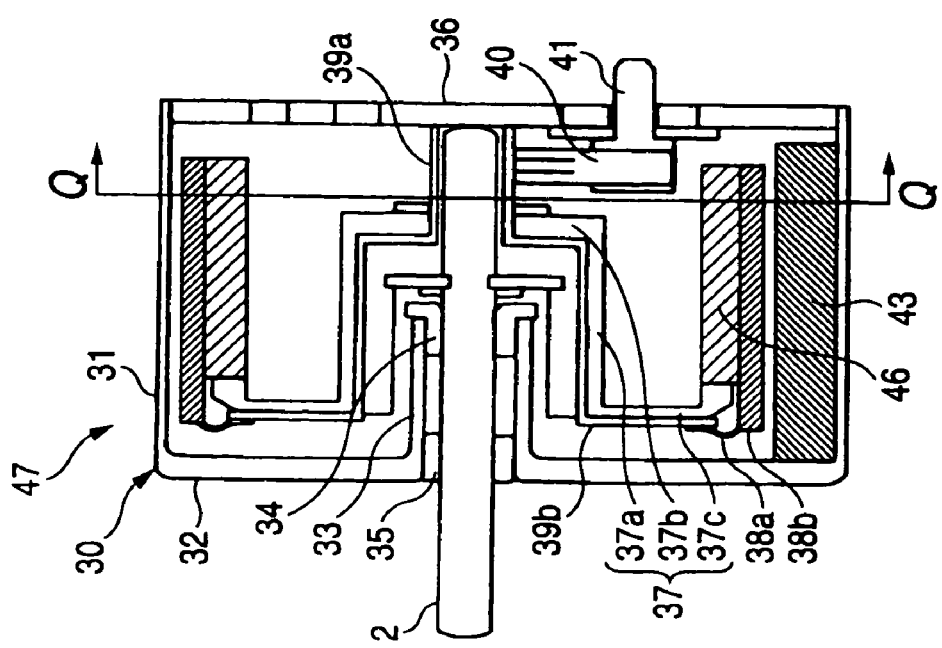
Figure 7:
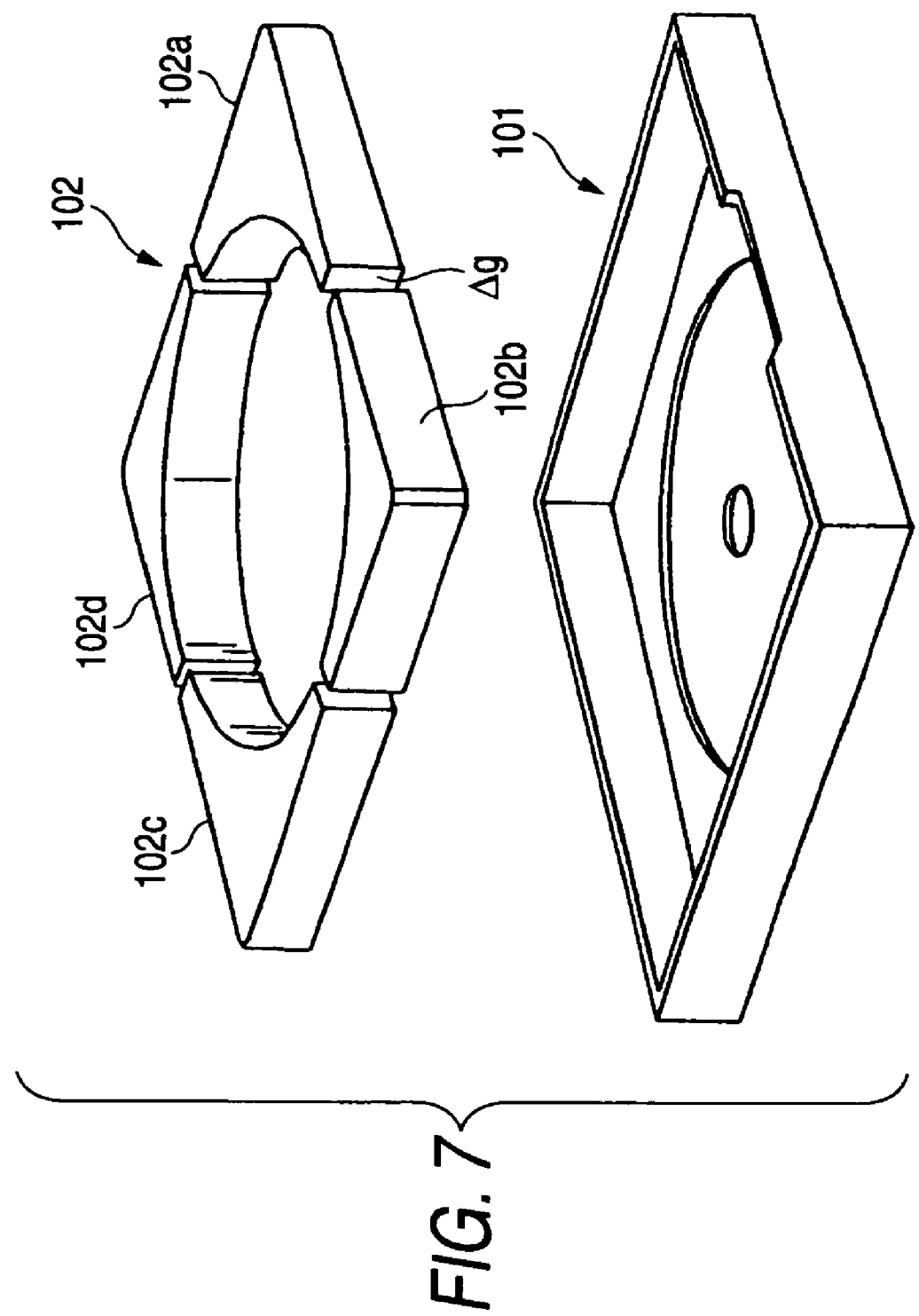
FIG. 7 is drawing which illustrates a conventional configuration of field magnets disclosed in JP-A-2000-279885.

FIGS. 6A and 6B illustrate sectional views of a slotless cored motor to which the magnet arranging configuration of the invention is applied.

FIG. 6A is a sectional view taken along line R-R in FIG. 6B, and FIG. 6B is a sectional view taken along line Q-Q in FIG. 6A. The slotless cored motor of this embodiment is also involved in the scope of the small DC motor of the invention.

A slotless cored motor 47 of the invention is configured such that, in place of the inner yoke 42 of the coreless motor described in Embodiment 4, a movable back yoke 46 is provided in such a manner as to be in contact with an inner side of an armature winding-molded element 38 and the movable back yoke 46 is supported by a commutator mold 37. The movable back yoke 46 is made of a resin into which a magnetic material is mixed or a magnetic material, and the movable back yoke 46 has no slots and is formed into a cylindrical shape like the armature winding-molded element 38.

To indicate a magnetic flux path, for example, a magnetic flux from a field magnet 43MNL having an N pole passes through by way of the armature winding-molded element 38, the movable back yoke 46, the armature winding-molded element 38, a field magnet 43MSL having an S pole and a motor frame 30. Since a location where the magnetic resistance becomes high is situated only at gaps between the magnet NML and the magnet MSL and the armature winding-molded element 38 along this path, a motor can be configured which has large flux density and large torque.

In addition, since the movable back yoke 46 is provided inside the armature winding-molded element 38, compared to the coreless motor 29 in Embodiment 4, inertial force becomes large and smooth rotation is provided.

While the embodiments have been described as being applied to the inner rotor motors, the invention can also be configured as an outer rotor motor in the event that a shaft is provided on a motor frame in which field magnets are provided, windings are fixed thereto and driving current is made to flow through the windings. In addition, the invention can also be configured as a generator in the event that an external power is imparted to the shaft for rotation.

The configurations that have been described heretofore can be combined differently in an appropriate fashion without altering the functions.

The armature assembly 22 is allowed to rotate both inside and outside the magnets which are arranged at a predetermined diverging angle.

In addition to the embodiments that have been described heretofore, the individual configurations can be combined to configure small DC motors of arbitrary properties.

The present application claims foreign priority based on Japanese Patent Application (JP 2005-202300) filed Jul. 11 of 2005, Japanese Patent Application (JP 2005-348028) filed Dec. 1 of 2005, the contents of which is incorporated herein by reference.

What is claimed is:

1. A small DC motor comprising:
    a motor frame comprising a cylindrical portion, the cylindrical portion having a constant thickness and having a cross section in a shape that comprises four sides and connecting portions, each of the connecting portions connecting adjacent two of the four sides;
    field magnets, each being positioned adjacent to each of the connecting portions, having an arc-shaped surface on an inside thereof and having a cross section in an inside portion that has an arc-shape and in an outside portion that has a same curvature as an inside surface of the connecting portions; and
    an armature assembly comprising an armature winding and a shaft and being disposed rotatably within the motor frame,
    wherein the field magnets are provided so as to be spaced apart from each other, wherein the small DC motor comprises an air gap between each of the four sides and a radially outermost surface of the armature assembly, and wherein the each of the connecting portions of the motor frame has a arc-shape, a radius of the arc-shaped surface on the inside of the connecting portions of the motor frame is set to any value from 5% to 85% of a radius from a center of the shaft to the arc-shaped surface of the inside of the field magnet.

2. A small DC motor according to claim 1, wherein the radius of the arc-shaped surface on the inside of the connecting portions of the motor frame is set to any value from 65%, to 85% of the radius from the center of the shaft to the arc-shaped surface of the inside of the field magnet.

3. A small DC motor according to claim 1, wherein a radius from a center of the shaft to an inside surface of the motor frame is substantially same as the radius from the center of the shaft to the arc-shape surface of the inside of the field magnets.

4. A small DC motor according to claim 1, wherein field magnet has a maximum thickness portion at portions corresponding to the connecting portions of the motor frame and a minimum thickness portion gradually decreasing from the maximum thickness portion toward circumferentially opposite end.

5. A small DC motor comprising:
(a) a motor frame comprising a cylindrical portion, the cylindrical portion having a constant thickness and having a cross section in shape that comprises 2 (n+1) side portions and corner portions, each of the corner portions being located between the adjacent two of the 2 (n+1) side portions and connecting together with the adjacent two side portions, wherein n is a positive integer of 2 or larger;

(b) field magnets attached to an inner surface of the motor frame, each of the field magnets having an arc-shaped surface on an inside thereof and an outer surface conforming to an inner surface of the corner portions of the motor frame; and (c) an armature assembly comprising an armature winding and a shaft and being disposed rotatably within the motor frame, (d) wherein the field magnets are provided so as to be spaced apart from each other, and the each of the field magnets has a maximum thickness at portions corresponding to the corner portions of the motor frame and a minimum thickness gradually decreasing from the maximum thickness portion toward circumferentially opposite end, (e) wherein the small DC motor comprises an air gap between each of the sides and a radially outermost surface of the armature assembly, the air gap being a minimum size needed to rotate the armature assembly, and (f) wherein a radius from the center of the shaft to an inside surface of the sides of the motor frame is substantially equal to a radius from the center of the shaft to the arc-shaped surface of the inside portion of the field magnets.

6. A small DC motor according to claim 5, wherein the cylindrical portion of the motor frame is formed into a hexagonal shape when n is 2.

7. A small DC motor according to claim 5, wherein the cylindrical portion of the motor frame is formed into an octagonal shape when n is 3.

* * * * *